Jan. 11, 1966     J. H. CASEY     3,228,076
EASY-OPENING SEAL OF ADHESIVE TAPE
Original Filed March 21, 1962                    7 Sheets-Sheet 1

INVENTOR.
JAMES H. CASEY
BY
*Carpenter, Kinney & Coulter*
ATTORNEYS

Jan. 11, 1966   J. H. CASEY   3,228,076
EASY-OPENING SEAL OF ADHESIVE TAPE
Original Filed March 21, 1962   7 Sheets-Sheet 3

FIG. 9

INVENTOR.
JAMES H. CASEY
BY
Carpenter, Kinney & Coulter
ATTORNEYS

INVENTOR.
JAMES H. CASEY
BY
Carpenter, Kinney & Coulter
ATTORNEYS

Jan. 11, 1966   J. H. CASEY   3,228,076
EASY-OPENING SEAL OF ADHESIVE TAPE
Original Filed March 21, 1962   7 Sheets-Sheet 5

INVENTOR.
JAMES H. CASEY
BY
Carpenter, Kinney & Coulter
ATTORNEYS

Jan. 11, 1966     J. H. CASEY     3,228,076
EASY-OPENING SEAL OF ADHESIVE TAPE
Original Filed March 21, 1962     7 Sheets-Sheet 7

INVENTOR.
JAMES H. CASEY
BY
*Carpenter, Kinney & Boulter*
ATTORNEYS

United States Patent Office 3,228,076
Patented Jan. 11, 1966

3,228,076
EASY-OPENING SEAL OF ADHESIVE TAPE
James H. Casey, Roseville, Minn., assignor to Minnesota Mining and Manufacturing Company, St. Paul, Minn., a corporation of Delaware
Original application Mar. 21, 1962, Ser. No. 181,244. Divided and this application Apr. 12, 1965, Ser. No. 463,061
2 Claims. (Cl. 24—16)

This application is a division of application Serial No. 181,244 filed March 21, 1962.

The present invention relates to an easy-opening seal of adhesive tape comprising a length of adhesive tape of which the adhesive side of the ends thereof have been rendered non-adhesive, so that the ends will not adhere to each other when the adhesive side of the tape which is intermediate the ends is adhered to and around an article and to itself, to form a flag type seal around the article. The ends of the length of tape thus provide a pair of tabs which can be grasped easily and pulled apart from each other when it is desired to disadhere the tape from itself and the article in order to open the seal.

The seal of the present invention is of the so-called "flag" type, wherein a length of adhesive tape is adhered to and around an article and to itself, with the adhesive surface of the tape which is intermediate the ends thereof adhered to the external surface of the article and with the adhesive surface of the remaining end portions of the length of tape adhered to each other to form a "flag." Such seals have long been known, but they have been objectionable for the reason that it has been extremely difficult to separate the two ends from each other in order to remove the seal. That is, the fact that the adhesive side of the extreme ends of the tape are adhered to each other makes it extremely difficult for a person to grasp those ends in their fingers in order to separate them from each other. Thus it has often been necessary to pick one end of the length of tape loose from the other with a fingernail, or other tool, and this is an exasperating experience even if the person is ultimately successful in opening the seal in this manner. As an alternative, people have often preferred to cut the seal from the article with a pair of scissors or a knife, and the thus severed seal could not be replaced to be used again to seal the article.

The disadvantages of the previous "flag" type of seal can be overcome by the use of the seal of the present invention, which seal provides a pair of tabs at the ends of the length of tape which is used to form the seal by preventing the ends from becoming adhered to each other. Thus, the tab ends are easy to grasp in the fingers of each hand to be pulled apart and disadhered from each other and the article when it is desired to open the seal. Therefore, the seal of the present invention can be said to be an "easy-opening" seal, and, since such a seal can usually be removed from the article in one piece, it will be available to be replaced onto the article in order to seal it again if it is so desired.

In the process or method of this invention, the adhesive surface of one of the ends of a length of tape is adhered to a piece of sheet material and the adhesive surface of the tape intermediate the ends thereof is adhered to and around the article and to itself, to form the flag type seal around the article. The adhesive surface of the other end of the length of tape is then adhered to the piece of sheet material. The sheet material can be in the form of a flat card which is thereby attached to extend between the ends of the length of tape. However, in the preferred form of the method, the tape to be used is the unwound end from a supply roll of tape, and the sheet material is in the form of a supply roll of paper in strip form. The paper from the supply roll is unwound to extend in the same direction as the tape which is unwound from a supply roll thereof, and the adhesive surface of the free end of the tape is adhered to the free end from the supply of paper. Thereafter, the tape which is adjacent to the end thereof is adhered around the article and to itself, to form the flag type seal. The tape from the supply roll which is adjacent to the seal is then adhered to that portion of the supply of paper which is adjacent to the end of the paper, and the tape and paper from the supplies thereof which are adhered to each other are severed across the width thereof, in order to detach the sealed article from the supply of tape and paper. The newly severed end from the supply rolls of both the tape and paper will thus be adhered to each other, so as to be ready for the next sealing operation.

A seal made in this manner provides a pair of tabs at the ends of the length of tape which is attached to the article, and the seal can be opened easily by a person who grasps one tab in each hand and pulls them apart from each other, causing the paper to be torn apart and the tape to be disadhered from itself and the article. The two torn pieces of paper remain adhered to each of the ends of the length of tape, and the pieces of paper thus prevent the ends from adhering to each other when the seal is replaced around the article.

An apparatus which can be used to form and attach the easy-opening seal of the present invention comprises a platen containing an aperture through which the paper, or other sheet material, can be threaded until one end thereof protrudes from the surface of the platen, means for adhering the adhesive surface from the end of the tape to the end of the paper and for temporarily adhering the adhesive surface of tape adjacent to the end thereof to the surface of the platen from which the end of the paper protrudes, and in a position adjacent to the aperture, and means for guiding the article to be sealed against the adhesive surface of the tape which is not adhered to the sheet material or the platen. The guiding means causes contiguous movement between the article and the surface of the platen as the article is moved relative to said surface and in the direction of the extent of the tape which is adhered to the platen, along the surface of the platen and across and beyond the aperture in the platen, and that movement serves to peel, and thus disadhere, the tape from the platen and causes the disadhered tape progressively to adhere to the article and to the adhesive surface of the tape itself, to form a flag type seal around the article. The movement of the article and the adhesive engagement between the end of the tape and the end of the sheet material thereafter serves to pull the sheet material through the aperture in the platen and results in the adhesive engagement of the sheet material with the adhesive surface of the tape, to provide an easy-opening seal which has sheet material adhered to both of the ends of the length of tape which forms the seal.

The machines which are illustrated in the accompanying drawings were constructed and adapted for special utility in forming and attaching an easy-opening seal of the present invention around the neck of a bag. It will be apparent, however, from the following description, that the illustrated machines can also be used to wrap a number of separate articles together, and that said machines can be adapted or modified for more varied usage without departing from the inventive concept involved. For a more complete understanding of the present invention, and the objects and advantages thereof, reference may be had to the following detailed description taken in connection with the accompanying drawings, in which drawings:

Figure 1:
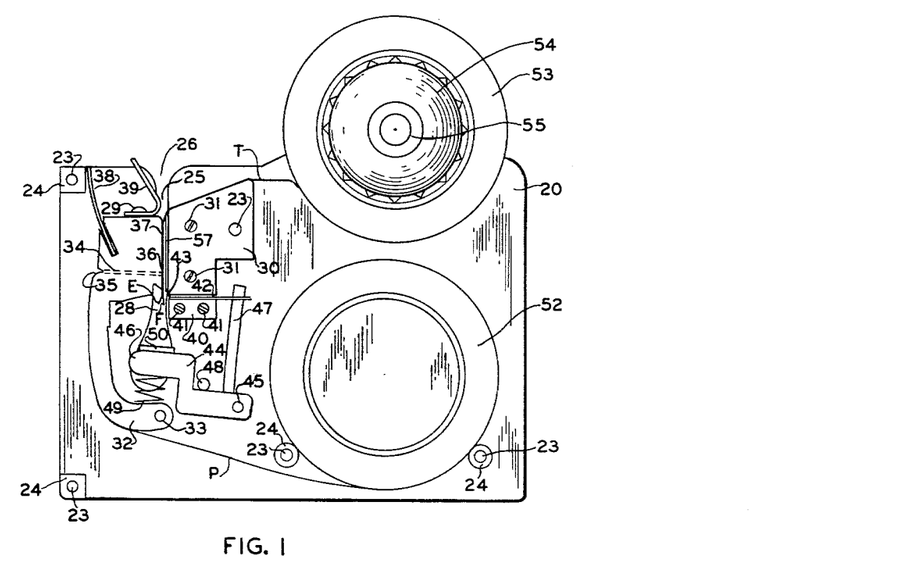
FIGURE 1 is a plan view of a manually operated bag sealing machine, showing the parts thereof in position to begin operation, with the cover plate for the machine removed therefrom, for purposes of clarity.
Figure 2:
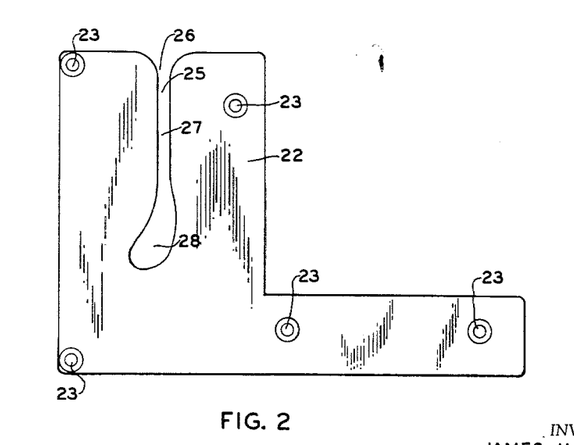
FIGURE 2 is a plan view of the cover plate which has been removed from the machine which is shown in FIGURE 1.

Referring first to FIGURES 1 and 2, the reference character 20 designates the frame of the machine shown in FIGURE 1, and a cover-plate 22, which is shown in FIGURE 2, is shaped similarly at one end thereof to the shape of the frame 20. Cover-plate 22 and frame 20 are each provided with corresponding circular apertures 23. A plurality of spacers 24 containing circular apertures are positioned between the corresponding apertures 23, and a plurality of screws, or other devices, are used for fastening cover-plate 22 to frame 20, and said spacers thus serve to provide a semi-enclosed area between said cover-plate and said frame. A shaped guide slot 25 is formed in a corresponding location through both the frame 20 and the cover-plate 22, so that said slot is open through the machine, and said slot is open to the edge of said frame and cover-plate, to form a recess 26 along one side of the machine. Guide slot 25 is formed to contain a narrow portion 27 and an enlarged blind end portion 28.

An anvil 30 is attached to frame 20 by screws 31. A shaped arm 32 is pivotably attached to frame 20 by a pin 33 and a slot aperture 34 is formed through the enlarged end portion of said arm. The aperture 34 begins at the point designated by the reference character 35 and terminates at the point designated by the reference character 36. The arm 32 is formed to contain a platen surface 37 along one side of the enlarged end of said arm, and the termination point 36 of the aperture 34 is located on said platen surface, as is most clearly shown in FIGURE 7. One end of a leaf spring 38 is affixed to the enlarged end of arm 32, and the other end of said spring bears against one of the spacers 24, and said spring acts to bias arm 32 into the position in which it is shown in FIGURE 1, and thus serves to urge platen surface 37 toward anvil 30. A horn 39 is attached to the enlarged end of arm 32 by a bolt 29, and said horn extends therefrom toward the recess 26.

A knife guide block 40 is attached to frame 20 by screws 41, and said block is so positioned as to provide a transverse passageway between it and the anvil 30. A knife blade 42 having a serrated cutting edge 43 is slidably positioned within the passageway between knife block 40 and anvil 30, as is shown in FIGURE 1.

A rocker bar 44 is pivotably attached by a pin 45 to frame 20, and the unattached end 46 of said bar extends into blind end portion 28 of the guide slot 25. A rocker arm 47 is affixed to rocker bar 44 and extends therefrom toward anvil 30. Knife blade 42 is formed to contain an enlarged aperture through said blade at the end of said blade which is opposite from serrated edge 43, and the rocker arm 47 protrudes through said aperture in such manner that said blade can slide on said arm. A stop pin 48 is attached to frame 20, and a spring 49 is positioned between the end 46 of rocker bar 44 and the arm 32, and said spring is compressed between said rocker bar and said arm, so that said spring serves to urge rocker bar 44 against stop pin 48 to bias knife blade 42 into the position in which it is shown in FIGURE 1. A resilient pad 50 is attached to the end 46 of rocker bar 44 along the surface of said bar which faces recess 26.

Figure 3:
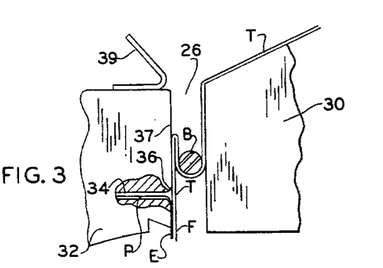
FIGURES 3 through 6 are enlarged schematic plan views of some of the parts of the machine shown in FIGURE 1, showing successive relative positions assumed by the parts of the machine, the paper sheet material, the tape and the neck of a bag during the operation of that machine.

A supply roll 52 of light weight paper in strip form is rotatably mounted between frame 20 and cover-plate 22, and the unwound paper P from said supply roll is threaded around arm 32 and through aperture 34, from the point 35 to the point 36, until the free end E of the unwound paper P protrudes from the platen surface 37, as is shown in FIGURE 3. A supply roll 53 of tape having a pressure-sensitive adhesive coating on one side thereof is mounted on a hub 54, and said hub is rotatably attached at 55 to frame 20 in such manner that said supply roll will unwind in the clockwise direction when viewed as is shown in FIGURE 1. The unwound tape T from supply roll 53 is threaded over anvil 30, with the non-adhesive side of the tape in contact with said anvil, and then between said anvil and platen surface 37. The horn 39 is moved by hand toward the spring 38, to move the platen surface 37 away from the anvil 30, against the force of spring 38, and the free end F of the unwound tape T is then adhered to the free end E of the paper P which protrudes from platen surface 37, as is shown in FIGURE 3. The tape T which is adjacent to free end F is then adhered to the platen surface 37, and the horn 39 is released, allowing spring 38 to move arm 32, with said platen surface, back toward anvil 30. The machine is then in the position shown in FIGURE 1, and is ready for operation.

Figure 6:
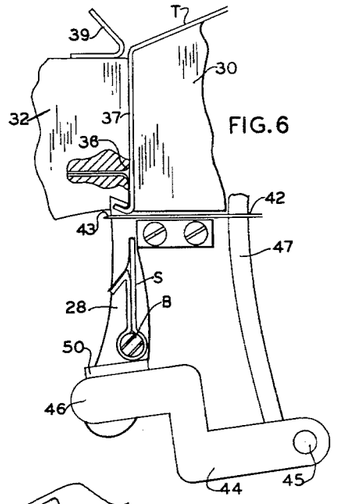
Figure 7:
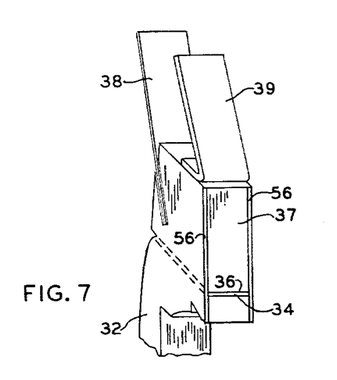
FIGURE 7 is an enlarged perspective view showing the platen surface of the machine which is shown in FIGURE 1.

As is shown in FIGURES 1 and 7, a pair of parallel ridges 56 extend from platen surface 37, and a corresponding pair of shoulders 57 are formed along each side of anvil 30. However, the ridges 56 are formed to extend a greater distance from platen surface 37 than the shoulders 57 are depressed from the face of anvil 30, so that there will be a slight space between platen surface 37 and the face of anvil 30 when the machine is in the position in which said platen has been moved to the position in which it is closest to said anvil. In FIGURE 1 the platen 37 has been moved to a slight extent away from anvil 30, in order to show the shoulders 57, and in FIGURES 3 through 6 the ridges 56 and shoulders 57 have been removed for purpose of clarity.

The operation of this machine is shown in FIGURES 3 through 6. In the operation of this machine, the article A to which the seal S is to be attached, here the neck B of a bag A which has been gathered together by hand, is moved into the recess 26. During this movement the neck of the bag B first contacts the horn 39 and moves said horn away from recess 26, causing arm 32 to be pivoted on bolt 33 and moving platen surface 37 away from anvil 30, against the force of spring 38. The neck of the bag B then contacts the adhesive side of that portion of the tape T which is not adhered to platen surface 37 but is disposed across the guide slot 25, between said platen surface and anvil 30, and the neck of the bag B becomes adhered to the adhesive surface of tape T as said bag and tape are moved by the operator to the position shown in FIGURE 3.

Figure 4:
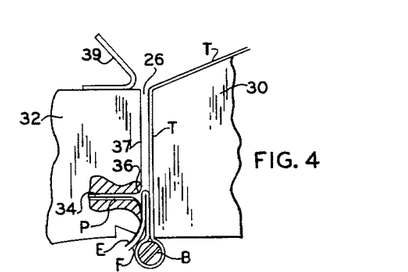
Figure 5:
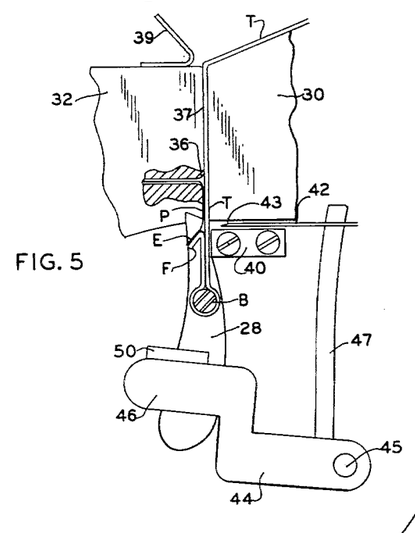

As the operator continues to apply pressure on the part of the bag A which protrudes from each side of the machine, the neck of the bag B is thereby moved in guide slot 25 toward the blind end portion 28 of said guide slot, and said bag neck is moved successively through the positions shown in FIGURES 3 through 6. This movement acts to peel the tape T which was adhered to platen 37 from said platen, and causes said disadhered tape to progressively adhere to the neck of the bag B and to the adhesive surface of the tape from the supply roll 53, to form a flag type seal around the neck of the bag, as is shown in FIGURE 4. Meanwhile, spring 38 acts to urge arm 32 with platen surface 37 toward anvil 30 as the neck of the bag B is moved between them, so that said platen surface is moved toward said anvil after the bag has been moved past them, as is shown in FIGURES 4 and 5. The movement of the neck of the bag B, from the position shown in FIGURE 4 to the position shown in FIGURE 5, causes the end E of paper P which is adhered to the end F of tape T to be pulled out from between platen 37 and anvil 30, causing paper P which is adjacent said end to be pulled through the aperture 34, and the movement of platen surface 37 back toward anvil 30 causes said adjacent paper P to become adhesively engaged with the adhesive surface of the tape T from the supply roll 53 which is adjacent to the seal, as is shown in FIGURE 5.

The neck of the bag B is then moved by the operator into the blind end portion 28 of the guide slot 25 and against the resilient pad 50 on the end 46 of rocker bar 44, as is shown in FIGURE 6. This movement causes rocker bar 44 to be pivoted on pin 45, against the force of spring 49, and the resulting movement of rocker arm 47 causes the serrated edge 43 of knife blade 42 to be moved against the newly adhered paper P and tape T, severing said adhesively engaged paper and tape across the width thereof, as is shown in FIGURE 6. The sealed bag neck is then withdrawn from the blind end portion 28 of the guide slot 25. Since the newly severed free end E of the paper P and the free end F of tape T have already become adhered to each other, and the tape T which is adjacent to said end has become adhered to the platen surface 37, during the operation of the machine, and the spring 49 acts to return rocker bar 44 to its original position, the machine is then in the position shown in FIGURE 1, and is ready for another operation to form and attach a seal to the neck of another bag.

Figure 8:
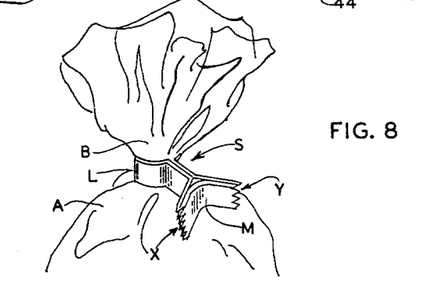
FIGURE 8 is a perspective view of a seal of this invention attached around the neck of a bag by the machines shown in FIGURES 1 and 9, only a portion of the bag being shown.

The bag A which has been sealed by, and removed from, the machine described above will appear similarly to that which is shown in FIGURE 8. A severed length of tape L is attached around the neck of the bag B, with the adhesive side of the tape adhered to the outside surface of the neck of the bag and to itself, to form a flag type of seal S, and the piece of paper M is adhered to the adhesive surface of the ends of the length of tape L to provide a pair of tabs X and Y. When it is desired to open the seal S, to remove the contents from the bag, the person desiring to do so will grasp the tabs X and Y by placing the thumb of each hand against the unadhered surface at each end of the piece of paper M and the index finger of each hand against the non-adhesive surface at each end of the length of tape L. The thumb and index finger of each hand are then moved toward each other, to squeeze each of the tabs X and Y in a separate hand, and, by moving the hands apart from each other, the piece of paper M will be caused to be torn across the width thereof, along approximately the interface of adherence of the length of tape L to itself, thereby separating the tabs X and Y from each other. Thereafter, the continuation of this same motion will result in the separation of the adhesive bond between the length of tape L to itself and to the surface of the bag, so that the person can place a hand into the bag in order to remove part or all of the contents of the bag. After the seal S has been so opened, it can be placed back onto the neck of the bag to again seal the neck of the bag, and, since the two torn ends of the piece of paper M will still be adhered to the ends of the length of tape L, to provide the tabs X and Y, the ends of tape will be prevented from becoming adhered to each other, and the tabs X and Y can be easily grasped to again open the seal S.

The machine described above has been found to be of particularly advantageous use in forming and attaching an easy-opening seal around the neck of a small bag containing articles of produce which are packed in a bag by commercial establishments which sell them to customers. The bags used for this purpose are usually made from plastic, mesh fabric or paper. This machine can be operated by people who have no previous training in the sealing of bags, and it is small and inexpensive enough that relatively large numbers of them can be used in any one establishment. Other types of commercial establishments, however, such as wholesale dealers in produce and growers of fruits and vegetables, have a need for a bag sealing machine which will operate very quickly and automatically for use in conjunction with conveyors which carry the bags from one place to another after they have been filled. Since electricity is usually used to operate the conveying equipment used by such concerns, such a means of power is available to operate an automatic bag sealing machine, and the machine shown in FIGURES 9 and 10 is so operated, and that machine has been found to be of particularly advantageous use for automatically forming and attaching a seal of this invention around bags being moved by a conveyor.

Figure 9:
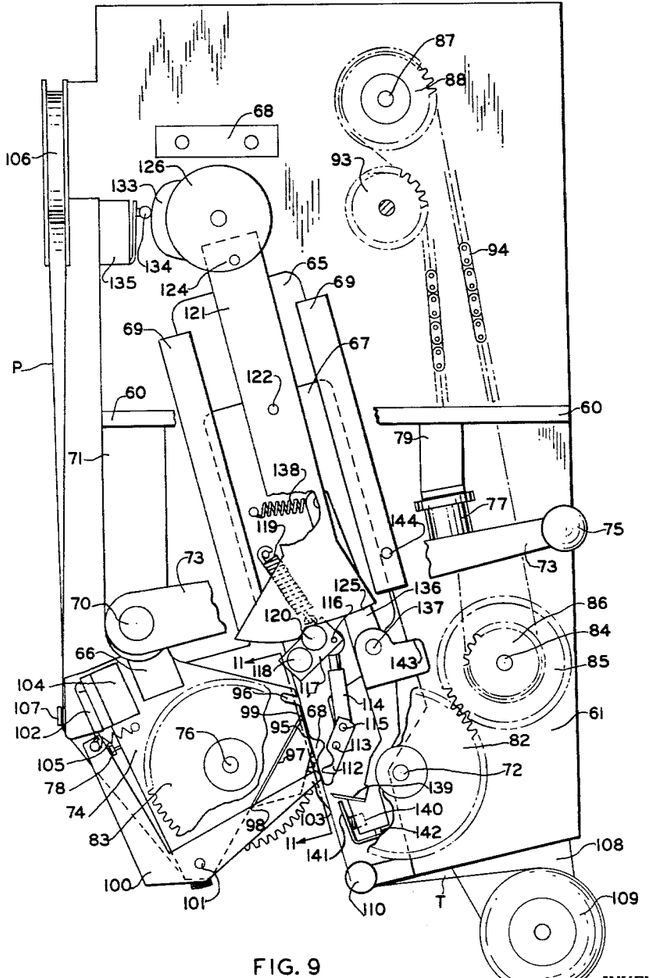
FIGURE 9 is a plan view of an automatic bag sealing machine, showing the parts thereof in position to begin operation, with some of the parts thereof either removed or partially broken away, for purpose of clarity.
Figure 10:
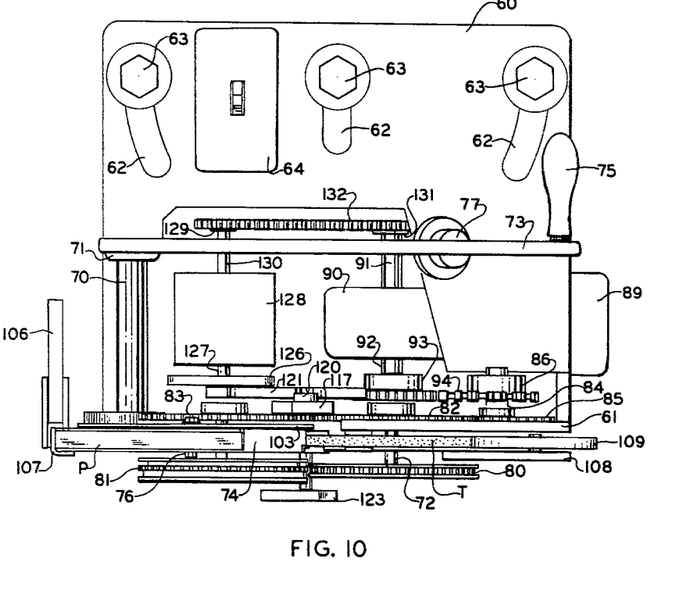
FIGURE 10 is an elevational view of the machine shown in FIGURE 9.

Referring now to the FIGURES 9 and 10, the reference character 60 designates the frame of this machine, and a mounting plate 61 is affixed to said frame to extend approximately perpendicularly thereto. Frame 60 is formed to contain a plurality of apertures 62 through which bolts 63 can be inserted and fastened in order to attach frame 60 in an adjusted position, either to a separate stand or to the frame of a conveyor, and in such manner that mounting plate 61 extends parallel to the conveyor and in the direction in which it is desired to move the bags to which the seal is to be attached. A switch 64 is attached to frame 60 and is operatively connected to control the supply of electrical power to the electrical parts of this machine, which parts will be described hereinafter.

The mounting plate 61 is formed to contain an open-end rectangularly shaped aperture 65 within which aperture a shaped slide block 67 is slidably held by four retaining strips 69. Retaining strips 69 are attached to both sides of mounting plate 61 and along both sides of aperture 65, so that slide block 67 will be held within said aperture as it is moved back and fourth by means which will be described hereinafter. Mounting plate 61 is also formed to contain two circular apertures through which a crank axle 70 and a shaft 72 are rotatably attached. A bracket plate 66 is affixed to crank axle 70, and a pivot plate 74 is affixed to said bracket plate. Pivot plate 74 is formed to contain a circular aperture through which a shaft 76 is rotatably attached. A long strut 71 having a circular aperture formed therein is affixed at one of its ends to frame 60 and extends outwardly therefrom parallel to mounting plate 61 so that one end of axle 70 protrudes through said aperture. A crank 73 is affixed to the protruding end of axle 70, and a crank handle 75 is rotatably attached to the other end of crank 73.

A permanent magnet 77 is affixed to the side of crank 73 in such position as to be attracted to a short strut 79 which is affixed to frame 60, and said magnet acts to hold pivot plate 74 in the position which is shown in FIGURE 9. However, the magnetic force of the magnet 77 is such that the attraction between it and the short strut 79 can be overcome when the machine is being prepared for operation, by the action of the operator by pulling on handle 75 to cause the axle 70 to be rotated in the clockwise direction, when viewed as is shown in FIGURE 9, to rotate pivot plate 74 away from mounting plate 61. This rotational movement of pivot plate 74 away from mounting plate can also be caused by the pressure of a bag which becomes jammed in the machine, since the pressure created by a jammed bag is sufficient to overcome the magnetic attraction between the magnet 77 and short strut 79.

In this particular machine, means is provided for gathering the neck of the bag to be sealed and for moving the gathered bag neck against the adhesive surface of the tape, and these means take the form of two pairs of rotatable gathering wheels. A gathering wheel 80 is affixed to the shaft 72 on one side of mounting plate 61, and a gathering wheel 82 is affixed to shaft 72 on the other side of said mounting plate. Also, a gathering wheel 81 is affixed to the shaft 76 on one side of pivot plate 74 and a gathering wheel 83 is affixed to shaft 76 on the other side of said pivot plate. The gathering wheels 80, 81, 82 and 83 are all formed to contain smooth-surfaced teeth around the entire peripheral edges of said wheels, and when crank 73 and pivot plate 74 are in the position shown in the FIGURES 9 and 10, the teeth on the opposing wheels contact and intermesh with each other so that the rotational movement of one of those wheels will cause all of the wheels to be rotated. As is shown in FIGURE 10, the gathering wheels 80 and 81 are both provided with flanges which extend outwardly on each side of the teeth, and said flanges serve to aid in holding the neck of the bag and also serve to prevent the teeth from damaging the bag after it has been moved between said wheels.

A stub shaft 84 is rotatably attached to mounting plate 61, and a gathering drive wheel 85 is affixed to said stub shaft. The gathering drive wheel 85 is formed to contain teeth around the entire peripheral edges thereof, and said wheel and teeth are formed and positioned to engage the teeth on the gathering wheel 82, as is shown in FIGURES 9 and 10. A sprocket 86 is affixed to shaft 84. A shaft 87 is rotatably attached to mounting plate 61, and an idler sprocket 88 is affixed to said shaft. A motor 89 is affixed to frame 60, and a reducing gear 90 is attached to said motor. The drive shaft from the motor 89 is engaged with the reducing gear 90, and said reducing gear is provided with a shaft 91 and a shaft 92 which extend from opposite ends thereof, so that said shafts are caused to be rotated in the same direction when switch 64 is turned on to provide electrical power to motor 89. A sprocket 93 is affixed to the shaft 92, and a chain 94 engages the teeth on sprockets 86, 88 and 93, so that when the sprocket 93 is caused to be rotated in the clockwise direction when viewed as is shown in FIGURE 9 the gathering wheel 82 will be driven in the clockwise direction, causing the gathering wheels 81 and 83 to be driven in the counterclockwise direction when the parts are in the position and are viewed as is shown in FIGURE 9. Thus, when a bag A is moved into the position between counter-rotating gathering wheels 80 and 82, and 81 and 83, the neck of the bag B will be grasped between the teeth of those wheels and moved from one side of the contact area of the opposing wheels to the other side of that area, and in the direction of the rotation of said wheels. The first part of the neck of the bag which is so moved by said wheels is held in the advanced position, and the following portions are moved against the first portion, thus causing the neck of the bag to become gathered.

Figure 11:
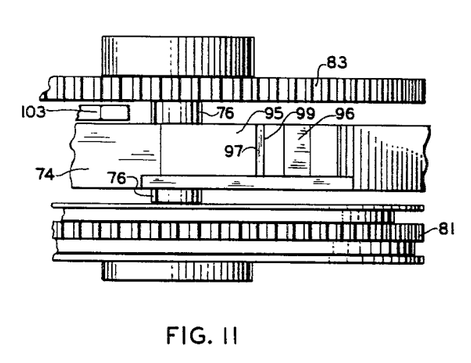
FIGURE 11 is an enlarged fragmentary sectional view taken as viewed on line 11—11 of FIGURE 9 after the paper and tape have been removed therefrom, for purpose of clarity.

Referring now to FIGURES 9 and 11, it will be seen that pivot plate 74 is formed to contain a platen surface 95, a recess 96 and an aperture 97. Aperture 97 is formed like a slot which is open along one side, but is not open on the other side, of pivot plate 74, and said aperture begins at the point indicated by the reference character 98 and terminates at the point indicated by the reference character 99, which latter point is located on the platen surface 95. The shafts 72 and 76 are journaled through bearings so that the gathering wheels are spaced slightly from pivot plate 74 and mounting plate 61, and a switch arm 100 is pivotably attached by a pin 101 to pivot plate 74 between the gathering wheel 83 and said pivot plate. An actuator 102 is attached to one end of switch arm 100 and the other end 103 of switch arm 100 is positioned to extend into the space which is subjacent to the area of contact between the gathering wheels 82 and 83. A switch 104 is attached to pivot plate 74 in position to be contacted by the actuator 102. An adjustable stop 78 is attached to the side of pivot plate 74 in position to be contacted by the switch arm 100. One end of a spring 105 is attached to switch arm 100, and the other end of said spring is attached to pivot plate 74, so that said spring serves to bias switch arm 100 toward and against the adjustable stop 78, and when said arm is in this position the actuator 102 is in contact with the switch 104. This action of spring 105 also serves to bias the end 103 of switch arm 100 into the position in which it will be contacted by the neck of a bag B which is moved between the gathering wheels.

A supply roll 106 of sheet material in strip form, such as a fairly light weight paper, is rotatably attached to the side of mounting plate 61 and a guide clip 107 is attached to the side of pivot plate 74. The unwound paper P from supply roll 106 is threaded through guide clip 107 and around the end of pivot plate 74, and then through the aperture 97, from the point 98 to, and beyond, the point 99 until the free end E of the paper P protrudes from platen surface 95. While this threading of the paper P can be done while the pivot plate 74 is in the position shown in FIGURE 8, it is usually done after the pivot plate 74 has been rotated by the operator to disengage the gathering wheels, so that the free end F of the tape T can be adhered to the free end E of the paper P and the platen 95 at that time.

A support plate 108 is affixed to mounting plate 61, and supply roll 109 of adhesive tape having a pressure-sensitive adhesive coating on at least one side is rotatably attached to said support plate. A guide roller 110 is rotatably attached to mounting plate 61 and the unwound tape T from said supply roll is threaded around the guide roller 110, with the non-adhesive side of the tape in contact with said roller. The operator then adheres the free end F of the unwound tape T to the free end E of the unwound paper P and the tape T which is adjacent to said end to the platen surface 95. Thereafter, the operator moves crank 73 to place the parts back into the position which is shown in FIGURE 9 so that when the motor 89 is turned on the threaded machine is ready for operation.

In this embodiment, the means for guiding the article to be sealed comprises the slide block 67. The slide block 67 is formed to contain a recess 68 along one side of said block, and said recess is formed in such position that when the paper and tape are threaded and adhered as described above, with the parts positioned as shown in FIGURE 9, the movement of the neck of a bag B through the rotating gathering wheels will cause the bag neck to be carried against the adhesive side of the tape T which is not adhered to the platen surface 95, and the neck of the bag B will move that tape ahead of it as it becomes gathered into said recess. The tape T is thus carried to the bottom of recess 68, and means is provided for holding the bag in said recess and against said tape while slide block 67 is moved in order to carry the bag in the direction of the extent of the tape which was adhered to the platen surface 95, said movement serving to peel the adhered tape from the platen to form the seal around the neck of the bag.

The means for holding the neck of the bag in the recess during the movement of the guiding means is comprised of a pair of latch fingers 112 which are pivotably attached to each side of slide block 67 by a pin 113. Slide block 67 is cut away at this point, and one end of a latch rod 114 is pivotably attached to one end of each of the latch fingers 112 by a pin 115, and the other end of said latch rod is pivotably attached at 116 to a latch block 117. Latch block 117 is pivotably attached to slide block 67 by a pin 118. One end of a spring 119 is attached to latch block 117 and the other end of said spring is attached to slide block 67, so that said spring acts to bias latch fingers 112 into the position shown in FIGURE 9. A cam follower 120 is affixed to latch block 117, and the movement of said cam follower against the action of spring 119 serves to move the latch fingers 112 toward the recess 68, and across both sides of said recess, in order to hold the neck of the bag B in said recess during the time when the slide block 67 is moved to carry the neck of the bag B contiguous to the platen usrface 95.

Figures 17, 18:
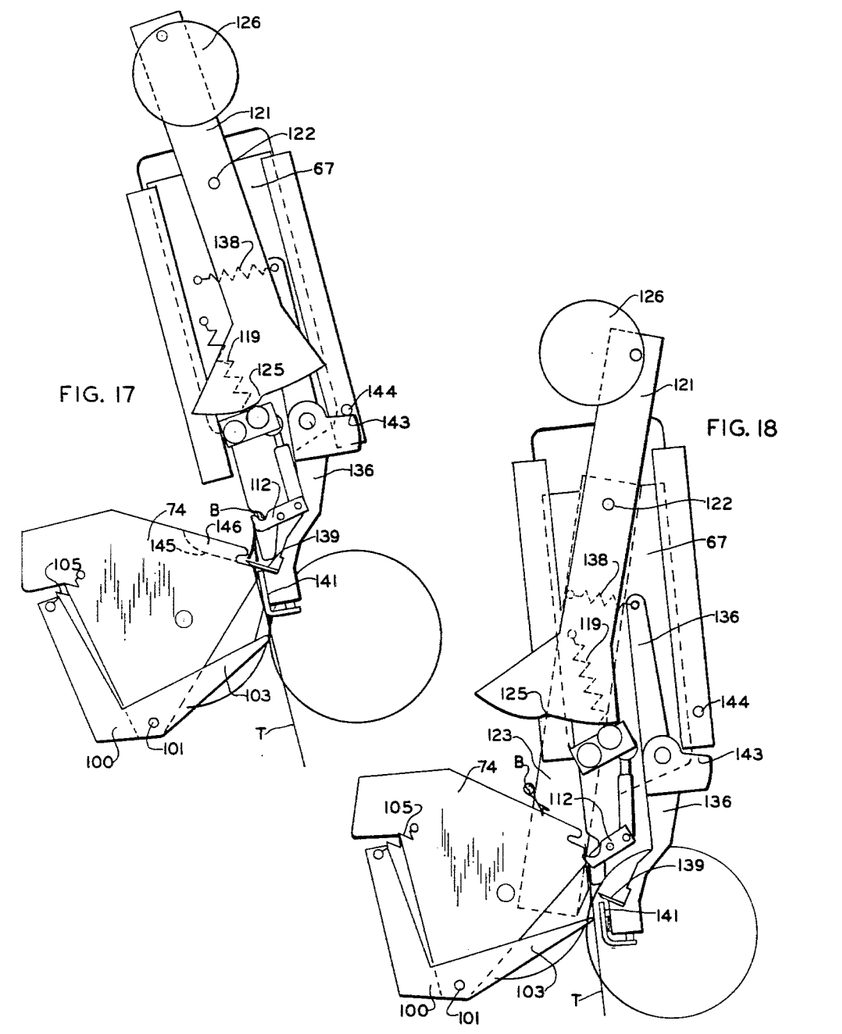

The side block 67 is moved back and forth in the rectangular aperture 65 in mounting plate 61 by means of a drive arm 121. Slide block 67 is provided with a circular aperture through the central portion, near one end of said block, and a stub shaft 122 is rotatably journaled through said aperture. The drive arm 121 is affixed intermediate the ends thereof to one end of stub shaft 122, and a kick-out arm 123 is affixed to the other end of said stub shaft 122. The kick-out arm 123 is positioned on the opposite side of slide block 67 from drive arm 121, and extends in the same general direction as does said drive arm, as is shown in FIGURES 10 and 18.

One end of drive arm 121 is formed to contain a circular aperture through which one end of a pin 124 is rotatably attached, and the other end of said drive arm is shaped to form a cam surface 125. The other end of the pin 124 is affixed to a drive wheel 126, and at a point near the periphery of said drive wheel, as is shown in FIGURE 9. Drive wheel 126 is affixed to the end of a shaft 127 from a clutch-brake assembly 128, and the clutch-brake assembly 128 is attached to mounting plate 61 by a bracket 68. Referring now to FIGURE 10, it will be seen that a sprocket 129 is attached to a shaft 130 which extends from the opposite side of clutch-brake assembly 128 from the shaft 127. A sprocket 131 is affixed to the end of the shaft 91 from reducing gear 90, and a chain 132 is attached around the sprockets 129 and 131. Thus, the operation of the motor 89 will cause the shaft 130 to be rotated continuously when the motor 89 is operating, but the clutch-brake assembly 128 operates in a well-known manner to prevent the rotational movement of the shaft 127 except when said clutch-brake assembly is actuated, at which time the clutch-brake assembly will operate to cause one complete revolution of the shaft 127 and the drive wheel 126 in the clockwise direction when viewed as shown in FIGURE 9. This movement of drive wheel 126 causes the drive arm 121 to be moved, and the movement of said drive arm causes slide block 67 to be moved back and forth in the rectangular aperture 65.

As is shown in FIGURE 9, a cam 133 is affixed to one side of the drive wheel 126, and an actuator 134 from a switch 135 is positioned for engagement by said cam. The switch 135 is attached to mounting plate 61 and is connected by electrical wiring to the clutch-brake assembly 128, so that the actuator 134 of said switch operates to stop the operation of said clutch-brake assembly after the shaft 127 has been rotated through one complete revolution. The switch 104 is also connected by electrical wiring to the clutch-brake assembly 128, and the operation of said switch through the movement of switch arm 100 by the movement of the neck of the bag B, and by the spring 105 after the bag neck has been completely gathered, serves to start the single revolution of drive wheel 126.

A knife arm 136 is pivotably attached intermediate the ends thereof to slide block 67 by a pin 137. One end of a spring 138 is attached to one end of knife arm 136, and the other end of said spring is attached to slide block 67, so that said spring serves to bias knife arm 136 toward the position of that arm as it is shown in FIGURE 9. A knife blade 139 is attached to the other end of knife arm 136. A spring-loaded pin 140 is journaled into knife arm 136 in a position near the knife blade 139, and a buffer plate 141 is attached to the end of said pin. A guide pin 142 is attached to knife arm 136 and is attached through a slot shaped aperture in buffer plate 141, so that the buffer plate 141 can be moved toward knife arm 136 when said buffer plate is moved against the platen 95.

The knife arm 136 is provided with a bearing surface 143, and a pin 144 is attached through one of the retaining strips 69 to mounting plate 61. The pin 144 is positioned so that it will be contacted by the bearing surface 143 of knife arm 136 when slide block 67 is moved toward drive wheel 126, so that knife arm 136 is then caused to be pivoted on the pin 137 in the clockwise direction when viewed as is shown in FIGURE 9, and knife blade 139 will then be caused to be moved into the recess 96 in pivot plate 74, to sever the adhered tape and paper. That movement of knife arm 136 also causes buffer plate 141 to be moved against the back of the tape T, and said buffer plate then acts to adhere said tape to the platen surface 95. When slide block 67 is moved away from drive wheel 126, knife arm 136 is also moved away from the pin 144, and the spring 138 then acts to return knife blade 139 and buffer plate 141 to the position which is shown in FIGURE 9.

The operation of this machine, with the paper and tape threaded and adhered as described above, is shown in FIGURES 13 through 18. When the switch 64 is turned, the operation of motor 89 will cause the shafts 91 and 92 to be rotated continuously, causing the chains 94 and 132 to be moved at a constant speed. Thus, gathering wheels 80, 81, 82 and 83 will be rotated at a constant speed, but slide block 67 will remain in the position in which it is shown in FIGURE 9.

Figures 13, 14:
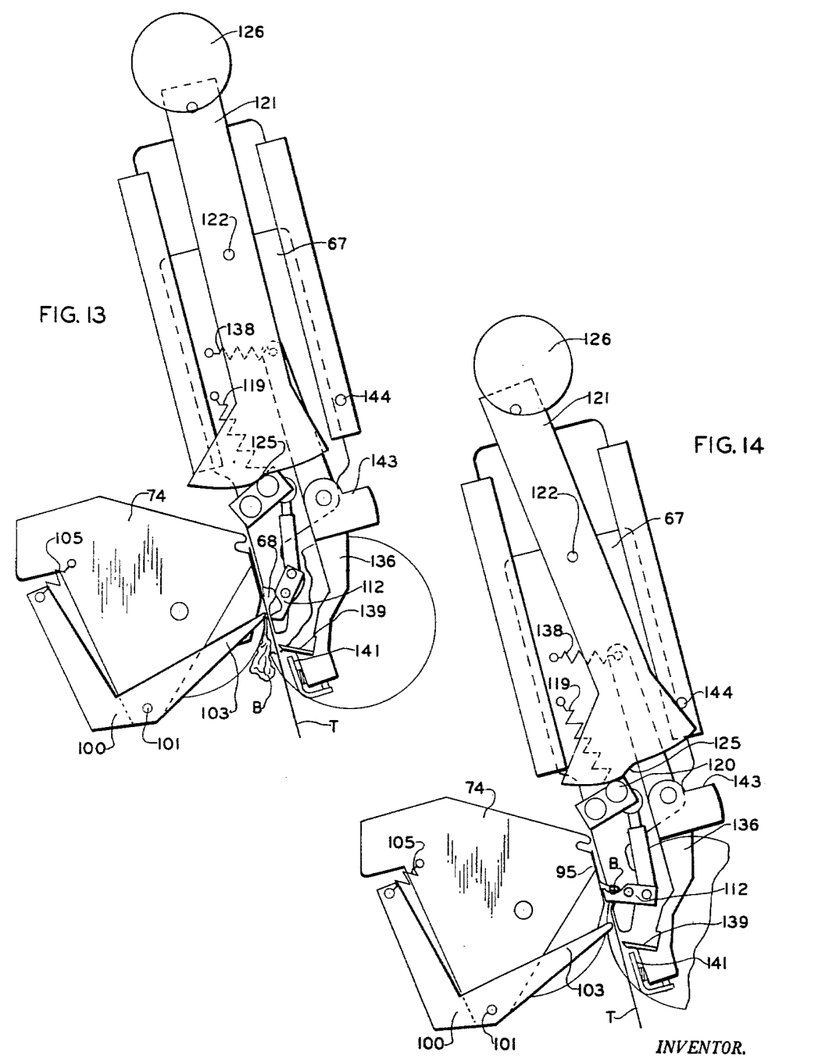
FIGURES 13 through 18 are schematic plan views of some of the parts of the machine shown in FIGURE 9, showing successive relative positions assumed by the moving parts of the machine, the paper sheet material, the tape and the bag during the operation of that machine.

Referring first to FIGURE 13, when the bag A is inserted between the rotating gathering wheels, the neck of the bag B will be caused to contact the end 103 of switch arm 100, causing said switch arm to be rotated in the counter-clockwise direction, when viewed as shown, on pin 101, with the result that the actuator 102 will become disengaged from the switch 104. However, after the neck of the bag B has been moved by the gathering wheels past the end 103 of switch arm 100, the action of spring 105 will cause the actuator 102 to be returned to again engage the switch 104, and said switch is so constructed and connected by electrical wiring to the clutch-brake assembly 128 that it will then cause said assembly to be operated to turn drive wheel 126. Thus, by the time at which the neck of the bag B has been carried by the gathering wheels and moved against the adhesive surface of the tape T and into the recess 68 in slide block 67, drive wheel 126 will begin to be moved in the clockwise direction, when viewed as shown, to carry drive arm 121 and slide block 67 through the positions which are shown in FIGURES 14 through 18, in order to form and attach the easy-opening seal around the neck of the bag B and provide the "easy-opening" seal which is shown on the bag A in FIGURE 8.

Referring now to FIGURE 14, it will be seen that the rotational movement of drive wheel 126 causes drive arm 121 to be pivoted on stub shaft 122, and the resulting action of cam surface 125 on cam follower 120 causes the latch fingers 112 to be moved across the recess 68 and against the neck of the bag B, to hold the neck of the bag in said recess and against the adhesive surface of the tape T. The cam surface 125 is formed and shaped in such manner that the cam follower 120 and the latch fingers 112 will be held in this position as drive arm 121 is caused to continue the rotational movement and slide block 67 is pulled toward drive wheel 126 to move the neck of the bag B along the surface of the platen 95, as it shown in FIGURE 15. This movement of slide block 67 acts to pull tape T from the supply roll 109 and to disadhere the tape which was attached to the plate 95 by peeling that tape from said platen and causing the disadhered tape progressively to adhere to the neck of the bag B and to the tape from the supply, to form a flag type seal around the article.

Figures 15, 16:
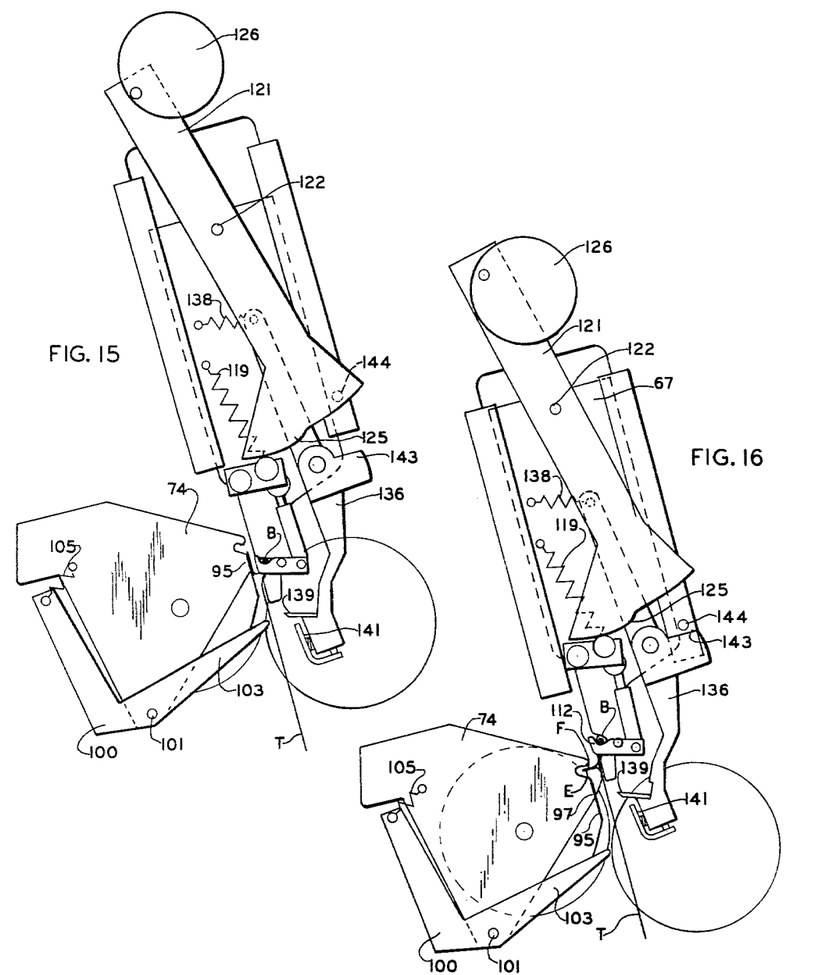

Referring now to FIGURE 16 it is there shown that during the movement of the bag neck B the previously adhered end E of the paper P and end F of tape T are pulled toward drive wheel 126, causing paper P to be pulled through the aperture 97. The continuation of the movement of slide block 67 causes the adhesive side of the tape from the supply roll 109 and which is adjacent to the seal to contact that portion of the paper P which is adjacent to the previously adhered end E as the paper P is pulled through aperture 97. Slide block 67 has then been moved toward drive wheel 126 to the position which is shown in FIGURE 17, and the bearing surface 143 of knife arm 136 strikes the pin 144, and said knife arm is caused to be pivoted on the pin 137 to move knife blade 139 against the newly adhered tape and paper. This movement of knife blade 139 assures the adherence of the tape from the supply roll 109 to the paper P from the supply roll of paper 106 by causing the tape to be moved toward the paper as the knife blade 139 contacts and then severs the adhered paper and tape across the width thereof, in order to detach the sealed bag from the supply of tape and paper. This movement of knife arm 136 also causes buffer plate 141 to be moved against the non-adhesive surface of the tape from the supply roll 109, to cause the tape which is adjacent to the newly severed end of tape to become adhered to platen surface 95, and to assure that the end of the tape is adhered to the end of the paper, so the paper and tape are ready for the next sealing operation.

As drive wheel 126 is rotated by clutch-brake assembly 128 from the position of said drive wheel as shown in FIGURE 15 to the position shown in FIGURE 16, the counter-clockwise rotational movement of drive arm 121 is changed to a clockwise rotational movement, when viewed as shown. As this movement continues slightly beyond the position shown in FIGURE 17, the shape of the cam surface 125 allows spring 119 to cause latch fingers 112 to be moved away from recess 68 as slide block 67 is moved away from drive wheel 126, releasing the neck of the bag B. As is shown in FIGURE 18, this movement of slide block 67 results in the movement of surface 143 away from pin 144, permitting spring 138 to act to return knife arm 136 to its original position on said slide block, thus retracting knife blade 139 from recess 96 and buffer plate 141 from platen surface 95. Also, kick-out arm 123 is then moved against the side of the sealed bag neck B, to make sure that said bag is removed from the recess 68. The slide block 67 is then returned to the original position which is shown in FIGURE 9, and the movement of drive wheel 126 is stopped in this position by the engagement of cam 133 with actuator 134, causing switch 135 to de-energize clutch-brake assembly 128. The machine is then in position to form and attach a seal to the neck of another bag.

Figure 12:
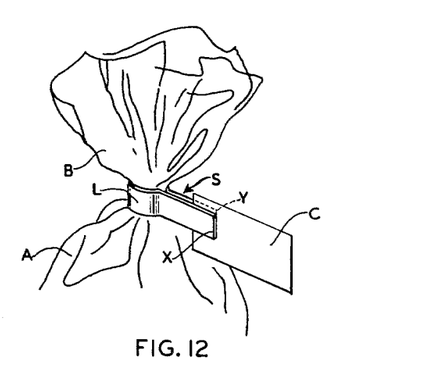
FIGURE 12 is a perspective view of a seal of this invention attached around the neck of a bag, only a portion of the bag being shown.

The "easy-opening" seal which has been formed and attached to the neck of the bag B by this machine will appear similarly to that which is shown in FIGURE 8, and what was said above regarding the construction and operation of the seal formed at attached by the machine shown in FIGURE 1 applies equally to the seal which is formed and attached during the above described operation of the machine which is shown in FIGURES 9 and 10. Also, the machine shown in FIGURES 9 and 10 can be used to form and attach the seal which is shown in FIGURE 12. In order to form and attach that seal to a bag A, the strip of paper P is removed from the machine, and the pivot plate 74 is cut along the dotted line 145 which is shown in FIGURE 17 so that the piece indicated by the reference character 146 can be removed therefrom. Thereafter, the operation of the machine will provide a seal to which no paper is attached, but the ends X and Y of the length of tape to which the paper would otherwise be adhered will not be adhered to each other. That is, the ends X and Y of the length of tape L will remain apart from each other for at least a short length of time after the sealed bag is removed from the machine, and those ends can be prevented from subsequently becoming adhered to each other by applying to the adhesive surface of the ends of the length of tape any of a number of known liquid materials which act to remove the adhesive qualities of pressure-sensitive adhesives. Alternatively, during the time within which the ends of the length of tape forming the seal remain apart from each other, a piece of sheet material can be adhered to the ends of the tape to prevent them from subsequently becoming adhered to each other. That piece of sheet material can be adhered so that only one surface of it is adhered to both of the ends of the length of tape, in which case it would appear similarly to the piece of paper M in FIGURE 8, or one surface of the piece of sheet material can be adhered to one of the ends of the length of tape and another surface of the sheet material can be adhered to the other end of the length of tape, with an edge of the sheet material positioned at the interface between the adhesive surfaces of the length of tape where it is adhered to itself, such as is shown by the attachment of the card C which is shown in FIGURE 12. The card C and paper M can be printed to contain an instructional message as to the operation of the seal, as well as various advertising or sales messages.

As is evident from the above description of my invention, many variations can be envisioned. Such variations, embodying some or all of the novel features herein, are comprehended, and I do not intend to be limited only to the embodiments herein described, but, rather, I intend to be limited only by my disclosure taken as a whole, including the appended claims.

I claim:

1. An easy-opening seal attached around an article, said seal comprising a length of adhesive tape and a piece of sheet material which is adhered to the adhesive surface of both of the ends of said length of tape, with the adhesive surface of said length of tape intermediate said ends adhered to and around the article and to itself, to form a flag type seal around the article, and with the same surface of said piece of sheet material adhered to both of said ends of tape to prevent the adherence of said ends of tape to each other so that said ends can be grasped easily in order to tear the sheet material across the width thereof and then disadhere the tape from itself and the article when it is desired to open the seal.

2. An easy-opening seal attached around an article, said seal comprising a length of adhesive tape and a strip of sheet material which is adhered to the adhesive surface of both of the ends of said length of tape, with the adhesive surface of said length of tape intermediate said ends adhered to and around the article and to itself, to form a flag type seal around the article, and with the same surface of said strip of sheet material adhered to both of said ends of tape to prevent the adherence of said ends of tape to each other and to form said ends into a pair of tabs which can be grasped easily and pulled away from each other in order to tear the sheet material across the width thereof and then disadhere the tape from itself and the article when it is desired to open the seal.

References Cited by the Examiner

UNITED STATES PATENTS

| | | |
|---|---|---|
| 1,687,859 | 10/1928 | Fontaine. |
| 2,142,194 | 1/1939 | Karfiol. |
| 2,292,272 | 8/1942 | Hirshfield. |
| 2,541,791 | 2/1951 | Taylor ______________ 40—2 X |
| 2,902,734 | 9/1959 | Walters. |

FOREIGN PATENTS

| | | |
|---|---|---|
| 495,689 | 5/1950 | Belgium. |
| 345,066 | 3/1931 | Great Britain. |

WILLIAM FELDMAN, *Primary Examiner.*

D. GRIFFIN, *Assistant Examiner.*